(12) United States Patent
Nagarajan et al.

(10) Patent No.: US 10,887,122 B1
(45) Date of Patent: Jan. 5, 2021

(54) DYNAMICALLY PROVIDING TRAFFIC VIA VARIOUS PACKET FORWARDING TECHNIQUES

(71) Applicant: Juniper Networks, Inc., Sunnyvale, CA (US)

(72) Inventors: Vikram Nagarajan, Bangalore (IN); Wen Lin, Andover, MA (US); Selvakumar Sivaraj, Sunnyvale, CA (US); Naveen Ashik, Bangalore (IN); Ramesh Kandula, Bangalore (IN); Princy T. Elizabeth, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 58 days.

(21) Appl. No.: 16/195,061

(22) Filed: Nov. 19, 2018

(51) Int. Cl.
| | |
|---|---|
| *H04L 12/18* | (2006.01) |
| *H04L 12/851* | (2013.01) |
| *H04L 12/813* | (2013.01) |
| *H04L 12/801* | (2013.01) |
| *H04L 12/721* | (2013.01) |

(52) U.S. Cl.
CPC .......... *H04L 12/1886* (2013.01); *H04L 47/15* (2013.01); *H04L 47/20* (2013.01); *H04L 47/2441* (2013.01); *H04L 47/2483* (2013.01); *H04L 45/32* (2013.01)

(58) Field of Classification Search
None
See application file for complete search history.

(56) References Cited

U.S. PATENT DOCUMENTS

| | | | | |
|---|---|---|---|---|
| 8,411,696 | B1* | 4/2013 | Ko | H04L 12/2861 370/419 |
| 9,906,495 | B2* | 2/2018 | Li | H04L 63/02 |
| 2008/0232276 | A1* | 9/2008 | Guntur | H04L 12/4625 370/256 |
| 2012/0127854 | A1* | 5/2012 | Khetan | H04L 12/4641 370/218 |
| 2014/0105012 | A1* | 4/2014 | Lavian | H04L 47/2433 370/230 |

(Continued)

OTHER PUBLICATIONS

Juniper Networks, Inc., "Overview of Multicast Forwarding with IGMP Snooping in an EVPN-MPLS Environment", https://www.juniper.net/documentation/en_US/junos/topics/concept/evpn-mpls-igmp-snooping-overview.html, Jun. 22, 2018, 7 pages.

*Primary Examiner* — Jay L Vogel
(74) *Attorney, Agent, or Firm* — Harrity & Harrity, LLP

(57) ABSTRACT

A device may receive a plurality of traffic flows to be provided to a set of destination devices. The device may process the plurality of traffic flows to identify respective sets of attributes associated with the plurality of traffic flows. The device may assign one of a plurality of traffic forwarding techniques, to a first traffic flow, of the plurality of traffic flows, based on the respective sets of attributes associated with the plurality of traffic flows. The device may provide the plurality of traffic flows to the set of destination devices. The device may determine that a condition, of a set of conditions associated with the plurality of traffic flows, has been satisfied in association with providing the plurality of traffic flows to the set of destination devices. The device may perform a set of actions after determining that the condition has been satisfied.

20 Claims, 11 Drawing Sheets

(56) References Cited

U.S. PATENT DOCUMENTS

| | | | |
|---|---|---|---|
| 2016/0021032 A1* | 1/2016 | Maier | H04L 49/70 370/401 |
| 2017/0149640 A1* | 5/2017 | Narayanan | H04L 43/062 |
| 2017/0289217 A1* | 10/2017 | Kebler | H04L 45/16 |
| 2019/0182124 A1* | 6/2019 | Jeuk | H04L 43/08 |

* cited by examiner

DYNAMICALLY PROVIDING TRAFFIC VIA VARIOUS PACKET FORWARDING TECHNIQUES

BACKGROUND

Packet forwarding is the providing of packets from one or more elements in a network to one or more other elements in the same network or in a different network. Packet forwarding takes the form of unicasting, broadcasting, or multicasting. In unicasting, a packet is provided from one element to another element until the packet reaches a destination element. In broadcasting, duplicated copies of a packet are provided to all elements in a broadcast domain, even if the packet is only destined for a subset of the elements in the broadcast domain. In multicasting, a packet is selectively duplicated and copies of the packet are provided to each of a set of destination elements.

SUMMARY

According to some implementations, a method may comprise: receiving, by a device, a plurality of traffic flows to be provided to a set of destination devices; processing, by the device, the plurality of traffic flows to identify respective sets of attributes associated with the plurality of traffic flows, wherein the respective sets of attributes are based on at least one of: respective flow characteristics of the plurality of traffic flows, or respective metadata associated with the plurality of traffic flows; assigning, by the device, one of a plurality of traffic forwarding techniques, to a first traffic flow, of the plurality of traffic flows, based on the respective sets of attributes associated with the plurality of traffic flows, wherein the plurality of traffic forwarding techniques is associated with providing the plurality of traffic flows to the set of destination devices, wherein the plurality of traffic forwarding technique includes: a first traffic forwarding technique associated with selective forwarding of traffic, and a second traffic forwarding technique associated with flood forwarding of traffic; providing, by the device, the plurality of traffic flows to the set of destination devices, wherein the first traffic flow is provided using the one of the plurality of traffic forwarding techniques assigned to the first traffic flow; determining, by the device, that a condition, of a set of conditions associated with the plurality of traffic flows, has been satisfied in association with providing the plurality of traffic flows to the set of destination devices; and performing, by the device, a set of actions after determining that the condition has been satisfied.

According to some implementations, a device may comprise: one or more memories; and one or more processors to: receive a plurality of traffic flows to be provided to a set of destination devices; process the plurality of traffic flows to identify respective sets of attributes associated with the plurality of traffic flows, wherein the respective sets of attributes are associated with assigning one of a plurality of traffic forwarding techniques, to each traffic flow of the plurality of traffic flows; assign the one of the plurality of traffic forwarding techniques to the each traffic flow based on the respective sets of attributes or based on a default rule, wherein the one of the plurality of traffic forwarding techniques is associated with providing the plurality of traffic flows to the set of destination devices via one of: selective forwarding, or flood forwarding; provide the plurality of traffic flows to the set of destination devices using the one of the plurality of traffic forwarding techniques assigned to the each traffic flow; determine that a condition, of a set of conditions associated with the plurality of traffic flows, has been satisfied in association with providing the plurality of traffic flows to the set of destination devices; and re-assign the one of the plurality of traffic forwarding techniques for at least some traffic flows, of the plurality of traffic flows, after determining that the condition has been satisfied.

According to some implementations, a non-transitory computer-readable medium storing instructions, the instructions comprising: one or more instructions that, when executed by one or more processors, cause the one or more processors to: receive a plurality of traffic flows to be provided to a set of destination devices; assign one of a plurality of traffic forwarding techniques to a first traffic flow, of the plurality of traffic flows, after receiving the plurality of traffic flows, wherein the one of the plurality of traffic forwarding techniques is associated with providing the plurality of traffic flows to the set of destination devices, wherein the plurality of traffic forwarding techniques includes: a selective multicast Ethernet tag (SMET) traffic forwarding technique, and an inclusive multicast Ethernet tag (IMET) traffic forwarding technique; provide the plurality of traffic flows to the set of destination devices using the one of the plurality of traffic forwarding techniques assigned to the first traffic flow; determine that a condition, of a set of conditions associated with the plurality of traffic flows, has been satisfied in association with providing the plurality of traffic flows to the set of destination devices; identify, after determining that the condition has been satisfied, a subset of traffic flows, of the plurality of traffic flows, for which a different traffic forwarding technique is to be assigned based on respective sets of attributes associated with the plurality of traffic flows; assign the different traffic forwarding technique to the subset of traffic flows after identifying the subset of traffic flows; and provide, using the different traffic forwarding technique, the subset of traffic flows to the set of destination devices after assigning the different traffic forwarding technique.

DETAILED DESCRIPTION

Figure 1A:
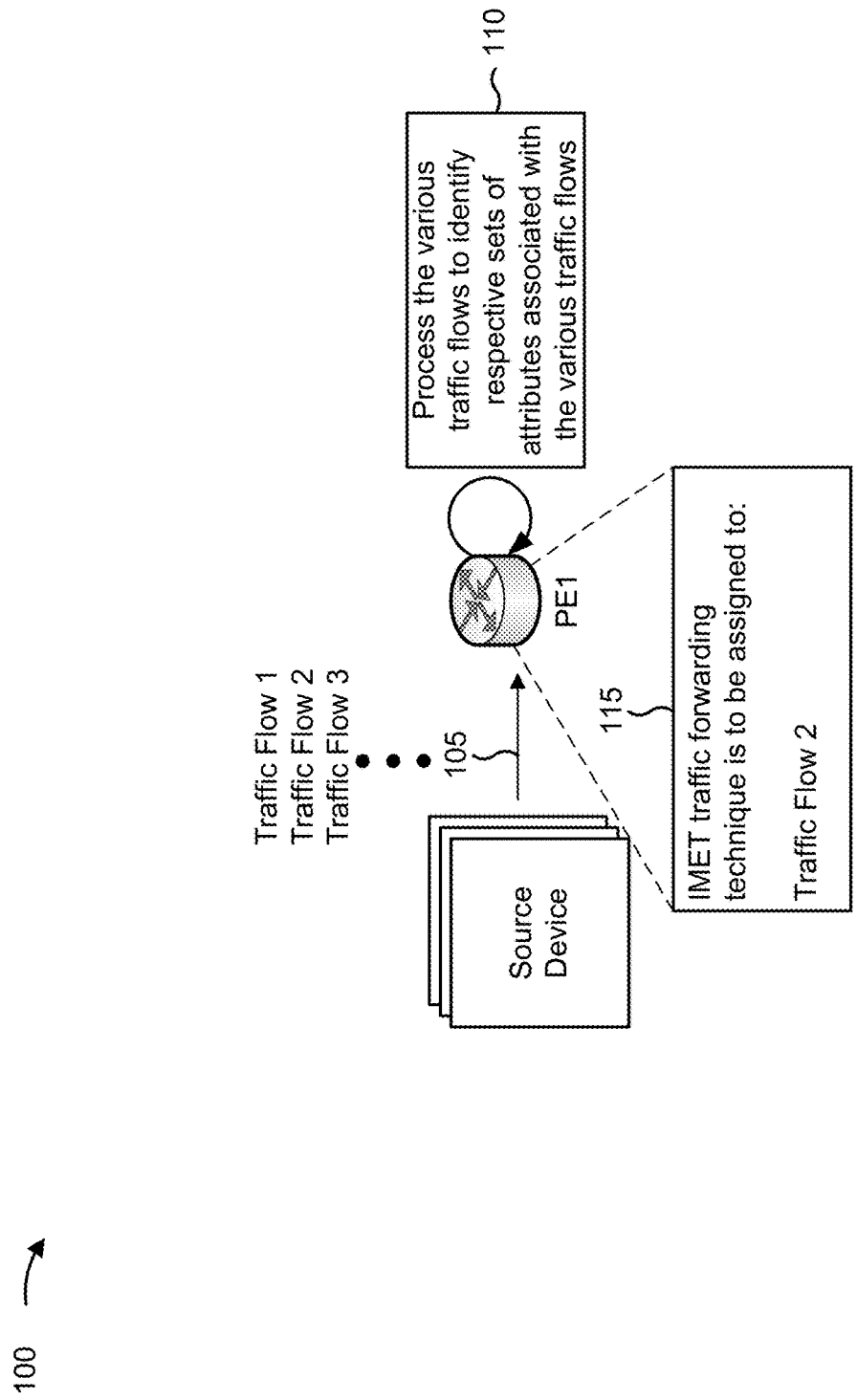
FIGS. 1A-1E are diagrams of an example implementation described herein.

The following detailed description of example implementations refers to the accompanying drawings. The same reference numbers in different drawings may identify the same or similar elements.

In some environments, a network device uses next hops for packet transmission. For example, when using next hops, the network device uses information that identifies a closest network device to identify a transmission path via which to provide a packet toward a destination. The network device stores the next hops in memory resources and identifies the next hops when the network device receives traffic. The limited capacity of the memory resources limits a maximum quantity of next hops that the network device can store. The quantity of next hops that the network device has to store can increase rapidly as the quantity of network devices included in a network increases. For example, if a network includes hundreds of network devices, then the network device may need to store thousands, tens of thousands, or more next hops. Depending on the amount of memory resources available to the network device, the network device may not be capable of storing this quantity of next hops.

Some implementations described herein provide a network device that is capable of dynamically assigning various traffic forwarding techniques to different traffic flows based on characteristics of the different traffic flows, pre-configured information regarding the different traffic flows, and/or the like. For example, the network device may dynamically assign an inclusive multicast Ethernet tag (IMET) traffic forwarding technique to a traffic flow (e.g., which uses flood forwarding rather than next hops) or a selective multicast Ethernet tag (SMET) traffic forwarding technique to the traffic flow (e.g., which uses selective forwarding via use of next hops) based on characteristics of the traffic flow, pre-configured information regarding the traffic flow, and/or the like. In this way, the network device can optimize use of traffic forwarding techniques that use next hops, rather than using a traffic forwarding technique that uses next hops for all traffic flows received by the network device. This optimization reduces a quantity of next hops that the network device has to store, thereby conserving memory resources of the network device. In addition, this optimization reduces or eliminates a need for the network device to perform a lookup of a next hop for every traffic flow that the network device receives, thereby conserving time associated with performing the lookup for every traffic flow and/or conserving processing resources associated with performing the lookup for every traffic flow. Further, this dynamic use of traffic forwarding techniques optimizes use of network resources (e.g., bandwidth, core network elements, and/or the like) by using a selective traffic forwarding technique for some traffic flows, rather than using a flood traffic forwarding technique for all traffic flows.

FIGS. 1A-1E are diagrams of an example implementation 100 described herein. Implementation 100 includes provider edge (PE) devices and network devices, such as a set of source devices and a set of destination devices (not shown in FIG. 1A).

As shown by reference number 105, the set of source devices may provide, and a first PE device ("PE1") may receive, various traffic flows (TFs). In some implementations, a traffic flow may include traffic (e.g., a set of packets) that is destined for a set of destination devices. In some implementations, PE1 may receive the various traffic flows at the same time, at different times, based on requesting the various traffic flows (e.g., based on corresponding requests from the various destination devices), and/or the like. In some implementations, the various traffic flows may include hundreds, thousands, or more traffic flows. Although multiple traffic flows are shown in FIG. 1A, in some implementations, PE1 may receive a single traffic flow. In some implementations, PE1 may receive the various traffic flows in a short amount of time, such as over fractions of a second.

In some implementations, PE1 may receive the various traffic flows after receiving a set of reports from the set of destination devices that indicates that the set of destination devices is interested in particular traffic flows. For example, PE1 may receive an Internet group management protocol (IGMP) report from a destination device that indicates that the destination device is interested in particular traffic flows of the various traffic flows. Additionally, or alternatively, PE1 may receive the various traffic flows after receiving other information that indicates that the set of destination devices is interested in particular traffic flows. For example, other PEs (e.g., PE2 through PE4, not shown in FIG. 1A) may receive IGMP reports from the set of destination devices, and the other PEs may provide Type 6 network layer reachability information (NLRI) to PE1 to indicate that the set of destination devices is interested in particular traffic flows of the various traffic flows.

As shown by reference number 110, PE1 may process the various traffic flows to identify respective sets of attributes associated with the various traffic flows. For example, PE1 may process the various traffic flows after receiving the various traffic flows, periodically, according to a schedule, based on receiving input from another device to perform the processing, and/or the like. In some implementations, an attribute may include a flow characteristic of a traffic flow. For example, a flow characteristic may include a size of packets associated with a traffic flow, a rate at which packets associated with the traffic flow are being received (e.g., packets per second (PPS)), whether the traffic flow is a steady traffic flow or a burst traffic flow, and/or the like. Additionally, or alternatively, an attribute may include metadata associated with a traffic flow. For example, the metadata may include a flow identifier that identifies the traffic flow, a source identifier that identifies a source device for the traffic flow, a destination identifier that identifies a destination device for the traffic flow, a timestamp for when the traffic flow was sent to PE1 and/or received by PE1, an importance identifier that identifies a measure of importance of the traffic flow, and/or the like.

In some implementations, PE1 may monitor a traffic flow for an amount of time to determine a set of attributes for the traffic flow. For example, PE1 may assign a default traffic forwarding technique to all of the various traffic flows for an amount of time, and may monitor the various traffic flows to determine respective flow characteristics of the various flows. Additionally, or alternatively, PE1 may process a header, control information, and/or the like associated with a packet included in a traffic flow to identify metadata associated with the traffic flow (e.g., by identifying particular values in particular fields in the header, by identifying the control information, and/or the like).

In some implementations, PE1 may determine whether PE1 has been pre-configured with a policy, a rule, and/or the like (e.g., pre-configuration of a multicast snooping option) associated with any of the various traffic flows that PE1 has received. For example, PE1 may determine whether PE1 has been pre-configured with a policy, a rule, and/or the like that indicates that a particular traffic forwarding technique is to be assigned to one or more traffic flows of the various traffic flows (e.g., based on previously known flow rates, resource consumptions, and/or the like). For example, and as shown by reference number 115, PE1 may determine that PE1 has been pre-configured with a policy, a rule, and/or the like that indicates that an IMET traffic forwarding technique is to be assigned to traffic flow 2, rather than a default traffic forwarding technique, such as an SMET traffic forwarding technique, being assigned to traffic flow 2. In some implementations, PE1 may determine whether PE1 has been pre-configured with a policy, a rule, and/or the like after processing the various traffic flows, based on receiving input to perform the determination of whether PE1 has been pre-configured, at a particular time after receiving the various traffic flows, and/or the like.

Figure 1B:
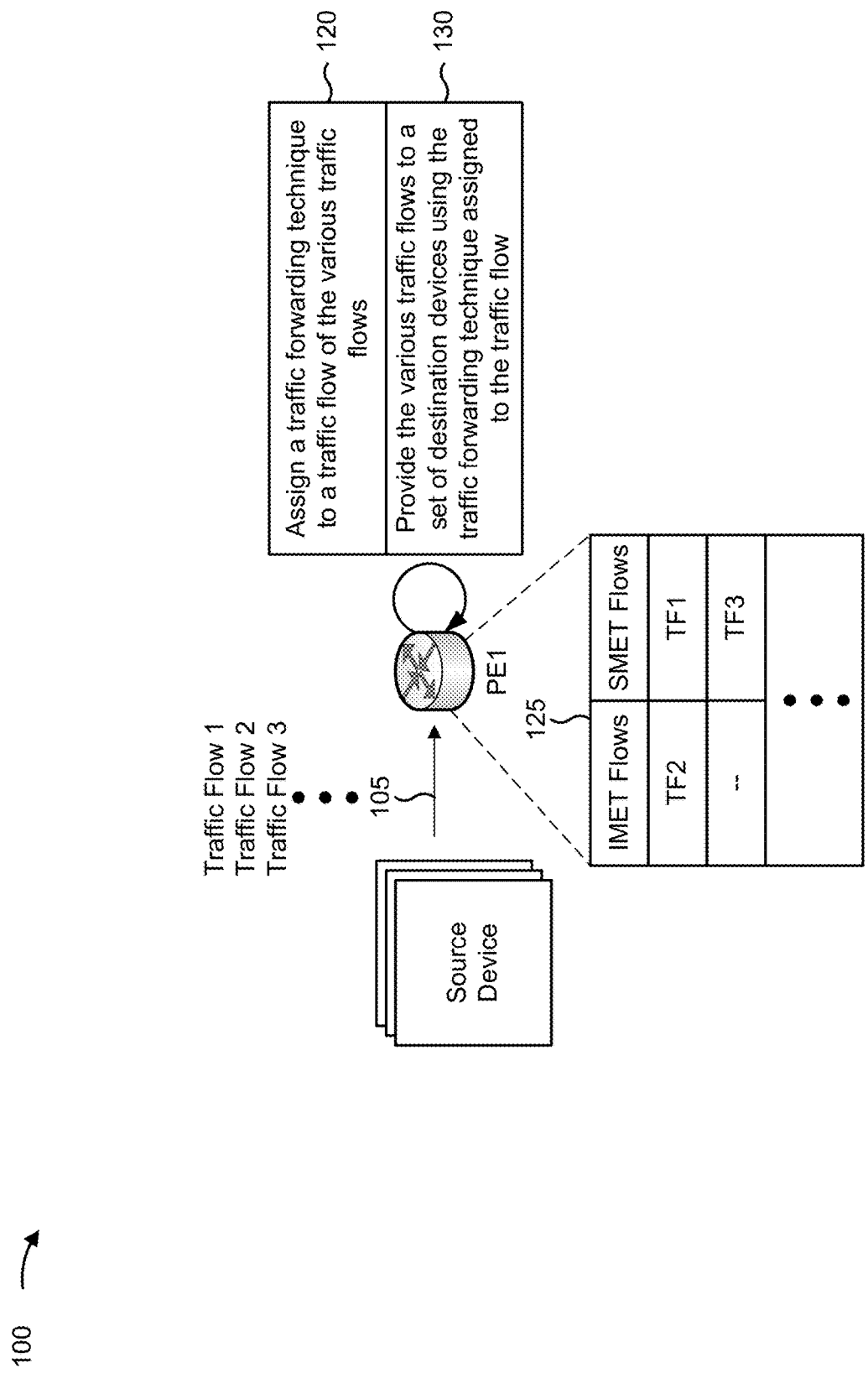

Turning to FIG. 1B, and as shown by reference number 120, PE1 may assign a traffic forwarding technique to a traffic flow of the various traffic flows. For example, PE1 may assign a traffic forwarding technique to a set of traffic flows, of the various traffic flows, after processing the various traffic flows, after determining whether PE1 has been configured with a policy, a rule, and/or the like, according to a schedule, periodically, and/or the like.

In some implementations, PE1 may assign a traffic forwarding technique by default. For example, PE1 may assign a default traffic forwarding technique, such as an SMET traffic forwarding technique, to all incoming traffic flows by default, unless pre-configured with a policy, a rule, and/or the like that indicates a different traffic forwarding technique is to be assigned to a traffic flow. In some implementations, PE1 may assign a default traffic forwarding technique automatically when PE1 receives a traffic flow. For example, PE1 may assign a default traffic forwarding technique upon receipt of a traffic flow and for an amount of time thereafter (e.g., even if PE1 is pre-configured with a policy, a rule, and/or the like that indicates a different traffic forwarding technique for the traffic flow), without needing to determine that the default traffic flow is to be assigned to the traffic flow, without needing to store information that identifies that the default traffic forwarding technique has been assigned to the traffic flow, and/or the like. This conserves memory resources of PE1 by reducing or eliminating a need for PE1 to store the information that indicates that a default traffic forwarding technique has been assigned to a traffic flow. In addition, this conserves time and/or processing resources associated with assigning a default traffic forwarding technique by reducing or eliminating a need for PE1 to determine to assign a default traffic forwarding technique to a traffic flow.

In some implementations, PE1 may assign a traffic forwarding technique based on a policy, a rule, and/or the like pre-configured for PE1. For example, and as described elsewhere herein, PE1 may be pre-configured with a policy, a rule, and/or the like that indicates a particular traffic forwarding technique that is to be assigned to a traffic flow. Continuing with the previous example, PE1 may assign the particular traffic forwarding technique to the traffic flow after determining that PE1 is pre-configured with the policy, the rule, and/or the like. In some implementations, PE1 may assign a different traffic forwarding technique to a traffic flow than indicated by a policy, a rule, and/or the like. For example, PE1 may assign a default traffic forwarding technique to all traffic flows that PE1 receives, and may monitor the various traffic flows to determine respective sets of attributes for the various traffic flows. Continuing with the previous example, PE1 may determine to maintain assignment of the default traffic forwarding technique (or to assign another traffic forwarding technique different from the traffic forwarding technique identified by a policy, a rule, and/or the like) to one or more of the various traffic flows, despite being pre-configured with a policy, a rule, and/or the like that indicates that a particular traffic forwarding technique is to be assigned to the one or more traffic flows.

In some implementations, PE1 may assign a traffic forwarding technique to a traffic flow based on respective sets of attributes associated with the various traffic flows. For example, PE1 may assign a traffic forwarding technique to a traffic flow based on flow characteristics of the traffic flow, based on metadata associated with the traffic flow, and/or the like. Continuing with the previous example, PE1 may categorize a traffic flow based on a set of attributes associated with the traffic flow (e.g., as a high importance flow, a medium importance flow, or a low importance flow based on an importance identifier, as a high resource consumption flow, a medium resource consumption flow, or a low resource consumption flow based on flow characteristics of the traffic flow, and/or the like), and may assign a traffic forwarding technique to a traffic flow based on the set of attributes associated with the traffic flow. This optimizes assignment of different traffic forwarding techniques to different traffic flows with different sets of attributes.

In some implementations, PE1 may assign a traffic forwarding technique to a traffic flow based on output from a machine learning model. For example, PE1 may use the machine learning model to process information that identifies a set of attributes associated with a traffic flow, and output from the machine learning model may indicate a traffic forwarding technique to be assigned to the traffic flow. In some implementations, the machine learning model may have been trained on a training set of data. For example, the training set of data may include information that identifies respective sets of attributes for various traffic flows and information that identifies a traffic forwarding technique that is to be assigned to each traffic flow of the various traffic flows.

Reference number 125 shows example assignments of traffic forwarding techniques to the various traffic flows (e.g., by default, based on a policy, a rule, and/or the like). For example, PE1 has assigned an IMET traffic forwarding technique to traffic flow 2 (TF2) based on the policy, the rule, and/or the like described with regard to reference number 115 in FIG. 1A. Additionally, or alternatively, and as additional examples, PE1 has assigned an SMET traffic forwarding technique to traffic flow 1 (TF1) and traffic flow 3 (TF3) by default. In some implementations, PE1 may store information that identifies assignments of traffic forwarding techniques to traffic flows in memory resources associated with PE1. Additionally, or alternatively, for any traffic forwarding techniques that use next hops, PE1 may store next hops in memory resources for the corresponding traffic flows. For example, PE1 may store next hops for TF1 and TF3 in memory resources associated with PE1 based on assigning the SMET traffic forwarding technique to TF1 and TF3. In this way, dynamic use of the IMET traffic forwarding technique for some traffic flows conserves memory resources of PE1 by reducing or eliminating a need for PE1 to store next hops for those traffic flows.

In some implementations, and with regard to the IMET traffic forwarding technique and the SMET forwarding technique specifically, this manner of assignment of traffic forwarding techniques (e.g., where the SMET traffic forwarding technique is assigned by default unless a policy, a rule, and/or the like indicates that the IMET traffic forwarding technique is to be assigned) optimizes conservation of network resources. For example, the IMET traffic forwarding technique, which uses flood forwarding (e.g., similar to broadcasting), consumes significant network resources because traffic flows are provided to all network devices connected to PE1. By using this traffic forwarding technique only when pre-configured to do so, PE1 conserves network resources relative to using the IMET traffic forwarding technique by default or for all traffic flows. In addition, using the IMET traffic forwarding technique for some traffic flows, rather than using the SMET traffic forwarding technique for all traffic flows, reduces a quantity of next hops that PE1 has to store. Some implementations may use the SMET traffic forwarding technique only when PE1 is pre-configured to do so and may use the IMET traffic forwarding technique by default. This manner of assigning traffic forwarding techniques conserves memory resources of PE1 by reducing a quantity of next hops that PE1 would have to store. In addition, using the SMET traffic forwarding technique for some traffic flows, rather than using the IMET traffic forwarding technique for all traffic flows, conserves network resources by reducing use of flood forwarding.

As shown by reference number 130, PE1 may provide the various traffic flows to a set of destination devices using the traffic forwarding technique assigned to the traffic flow. For example, PE1 may provide the various traffic flows after assigning a traffic forwarding technique to each of the various traffic flows, based on receiving input from another device to provide the various traffic flows, and/or the like. In some implementations, PE1 may provide traffic flows associated with flood forwarding to all devices connected to PE1 (e.g., between PE1 and a set of destination devices intended to receive the traffic flows), regardless of whether any of the devices would be included in a next hop for the traffic flows. For example, PE1 may flood forward TF2 based on the IMET traffic forwarding technique having been assigned to TF2. Additionally, or alternatively, PE1 may provide traffic flows associated with a selective forwarding traffic forwarding technique to selective devices connected to PE1 (e.g., between PE1 and a set of destination devices intended to receive the traffic flows), rather than flood forwarding the traffic flows. For example, PE1 may selectively forward, using corresponding next hops, TF1 and TF3 based on the SMET traffic forwarding technique having been assigned to TF1 and TF3.

Figure 1C:
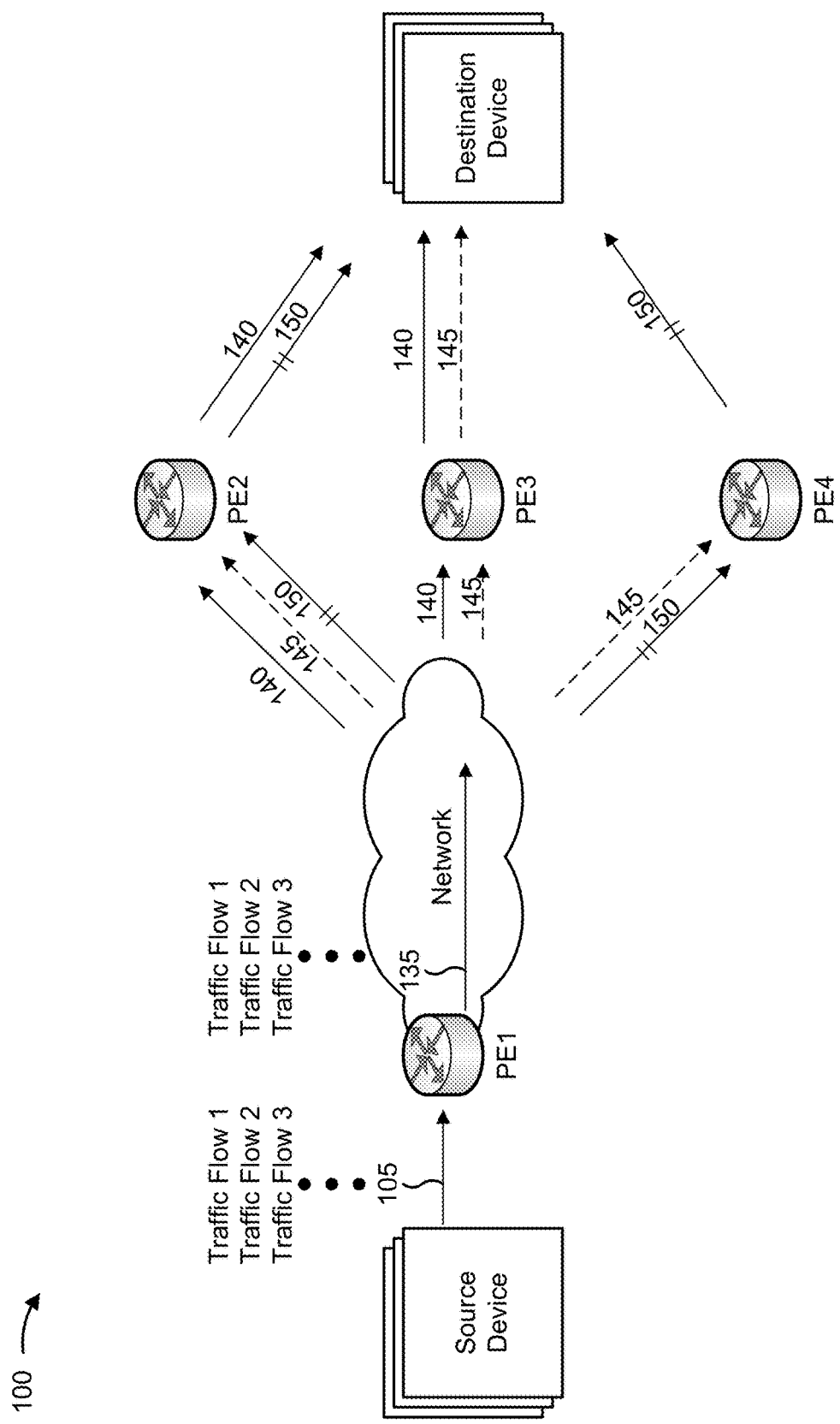

Turning to FIG. 1C, and as shown by reference number 135, PE1 may provide the various traffic flows toward a set of destination devices. For example, PE1 may provide the various traffic flows via one or more other devices of a network. Continuing with the previous example, PE1 may flood forward the traffic flows to the devices, may selectively forward the traffic flows to the devices, and/or the like.

As shown by reference numbers 140, PE1 may selectively forward TF1 using the SMET traffic forwarding technique. For example, PE1 may provide TF1 to PE2 and PE3 using next hops that indicate that TF1 is to be provided to PE2 and PE3, which may then provide TF1 to one or more of the set of destination devices. As shown by reference numbers 145, PE1 may flood forward TF2 using the IMET traffic forwarding technique. For example, PE1 may provide TF2 to PE2, PE3, and PE4. In some implementations, because TF2 is flood forwarded, PEs that are not interested in TF2 (e.g., that would not be associated with a next hop for TF2), such as PE2 and PE4, may drop TF2. In some implementations, other PEs that received TF2, and that are interested in TF2 (e.g., PE3), may provide TF2 to one or more of the set of destination devices. As shown by reference numbers 150, PE1 may selectively forward TF3 using the SMET traffic forwarding technique. For example, PE1 may provide TF3 to PE2 and PE4 using next hops that indicate that TF3 is to be provided to PE2 and PE4, which may then provide TF1 to one or more of the set of destination devices.

Figure 1D:
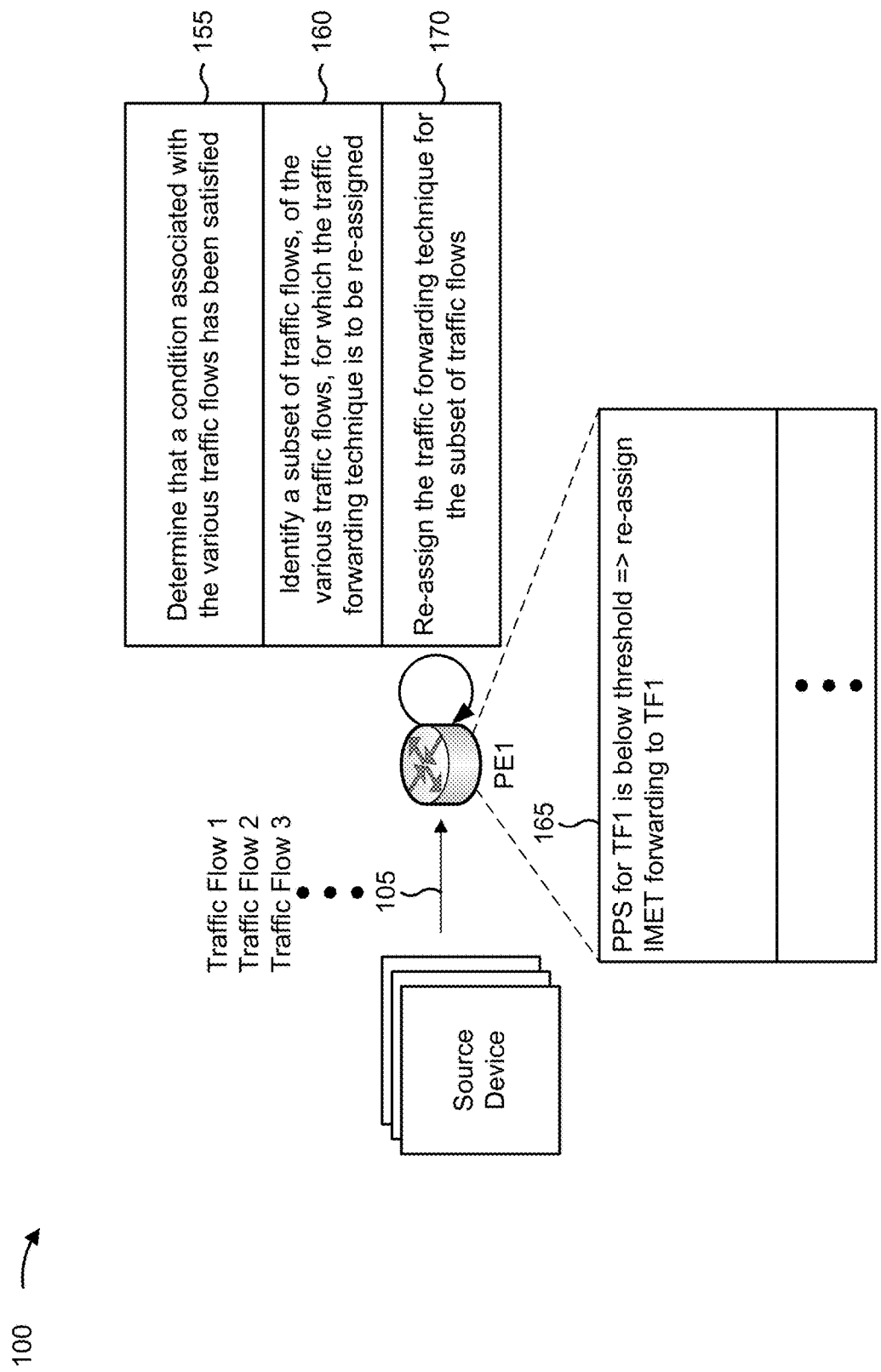

Turning to FIG. 1D, and as shown by reference number 155, PE1 may determine that a condition associated with the various traffic flows has been satisfied. For example, PE1 may determine that a condition associated with the various traffic flows has been satisfied in association with providing the various traffic flows.

In some implementations, a condition may be related to an attribute of a traffic flow (e.g., a change in a value of an attribute), an assignment of a traffic forwarding technique to a traffic flow, an amount of time that has elapsed since PE1 started providing the various traffic flows, a quantity of destination devices that are interested in a traffic flow (or whether the interested destination devices are local or remote to PE1), and/or the like. For example, PE1 may monitor the various traffic flows for changes in respective flow rates of the traffic flows, and may determine that a condition has been satisfied when a flow rate for a traffic flow satisfies a threshold. Additionally, or alternatively, and as another example, PE1 may monitor a quantity of traffic flows to which a traffic forwarding technique is assigned, such as the SMET traffic forwarding technique, and may determine that a condition has been satisfied when the quantity satisfies a threshold. Additionally, or alternatively, and as another example, PE1 may monitor an amount of time that has elapsed since providing a traffic flow, and may determine that a condition has been satisfied when the amount of time satisfies a threshold.

Additionally, or alternatively, and as another example, PE1 may determine that a threshold quantity of destination devices is interested in a traffic flow, and may determine that a condition is satisfied based on the quantity satisfying the threshold. For example, PE1 may determine that a flood forwarding traffic forwarding technique can be used for a traffic flow for which a threshold quantity of destination devices is interested because the flood forwarding will not consume significantly more network resources than selective forwarding of the traffic flow (e.g., due to the difference between the quantity of devices that would receive the traffic flow when flood forwarded and that would receive the traffic flow when selectively forwarded). In addition, PE1 may determine that memory resource savings due to use of the flood forwarding will be greater than network resource savings due to use of the selective forwarding for the traffic flow.

As shown by reference number 160, PE1 may identify a subset of traffic flows, of the various traffic flows, for which the traffic forwarding technique is to be re-assigned. For example, PE1 may identify a subset of traffic flows after determining that a condition associated with the various traffic flows has been satisfied.

In some implementations, PE1 may identify a subset of traffic flows based on which traffic flows, of the various traffic flows, are associated with a condition that has been satisfied. For example, PE1 may identify a subset of traffic flows by identifying traffic flows, of the various traffic flows, for which an attribute has changed, for which an attribute satisfies a threshold, and/or the like. As a specific example, PE1 may identify a subset of traffic flows by identifying traffic flows, of the various traffic flows, for which a flow rate satisfies a threshold.

In some implementations, PE1 may classify each of the subset of traffic flows after identifying the subset of traffic flows. For example, PE1 may classify each of the subset of traffic flows based on a measure of importance of each of the subset of traffic flows (e.g., as determined from a change in an importance identifier, based on using a machine learning model, and/or the like), based on a predicted and/or past resource consumption of each of the subset of traffic flows (e.g., may classify each of the subset of traffic flows as a high resource consumption traffic flow, as a medium resource consumption traffic flow, or as a low resource consumption traffic flow), and/or the like.

In some implementations, PE1 may determine to re-assign a traffic forwarding technique for the subset of traffic flows based on the identifying the subset of traffic flows. For example, PE1 may determine to assign a first traffic forwarding technique (e.g., an IMET traffic forwarding technique) to a traffic flow for which a second traffic forwarding technique (e.g., an SMET traffic forwarding technique) was previously assigned, may determine to assign the second traffic forwarding technique to a traffic flow for which the first traffic forwarding technique was previously assigned, and/or the like. In some implementations, PE1 may determine to re-assign traffic forwarding techniques when the subset of traffic flows includes a quantity of traffic flows that satisfies a threshold. This conserves processing resources of PE1 that would otherwise be wasted constantly re-assigning traffic forwarding techniques on a flow-by-flow basis (e.g., by causing PE1 to wait until the subset of traffic flows includes a quantity of traffic flows that satisfies a threshold before re-assigning the traffic forwarding techniques).

In some implementations, PE1 may determine to not re-assign a traffic forwarding technique for a traffic flow included in the subset of traffic flows. For example, despite a condition being satisfied, PE1 may determine that attributes for a traffic flow, of the subset of traffic flows, have not changed, have not changed by a threshold amount, and/or the like, and may determine to not re-assign a traffic forwarding technique for the traffic flow. Additionally, or alternatively, and as another example, PE1 may use a machine learning model to process attributes associated with a traffic flow when a condition is satisfied, and output from the machine learning model may indicate that the traffic forwarding technique for the traffic flow should not be re-assigned.

Reference number 165 shows an example of identifying a subset of traffic flows. For example, PE1 may have determined that a flow rate (e.g., PPS) for TF1 is below a threshold (and therefore a low resource consumption traffic flow), and may identify TF1 as the subset of traffic flows. As a result, and as further shown by reference number 165, PE1 may determine to re-assign the IMET traffic forwarding technique to TF1, to replace the SMET traffic forwarding technique that was previously assigned to TF1.

As shown by reference number 170, PE1 may re-assign the traffic forwarding technique for the subset of traffic flows. For example, PE1 may re-assign the traffic forwarding technique for the subset of traffic flows after identifying the subset, based on receiving input from another device to re-assign the traffic forwarding technique, and/or the like.

In some implementations, PE1 may assign a first traffic forwarding technique (e.g., an IMET traffic forwarding technique) to a traffic flow for which a second traffic forwarding technique (e.g., an SMET traffic forwarding technique) was previously assigned, may assign the second traffic forwarding technique to a traffic flow for which the first traffic forwarding technique was previously assigned, and/or the like. In some implementations, PE1 may store or delete next hops from memory resources based on the re-assignment. For example, when PE1 re-assigns a traffic forwarding technique that uses flood forwarding (e.g., an IMET traffic forwarding technique) to a traffic flow for which a traffic forwarding technique that uses selective forwarding was previously assigned (e.g., an SMET traffic forwarding technique), PE1 may delete next hops associated with the traffic flow from memory resources. This conserves memory resources of PE1 by reducing or eliminating next hops from memory resources. Additionally, or alternatively, and as another example, when PE1 re-assigns a traffic forwarding technique that uses selective forwarding (e.g., an SMET traffic forwarding technique) to a traffic flow for which a traffic forwarding technique that uses flood forwarding was previously assigned (e.g., an IMET traffic forwarding technique), PE1 may store next hops associated with the traffic flow in memory resources. This conserves network resources by reducing or eliminating use of flood forwarding.

Figure 1E:
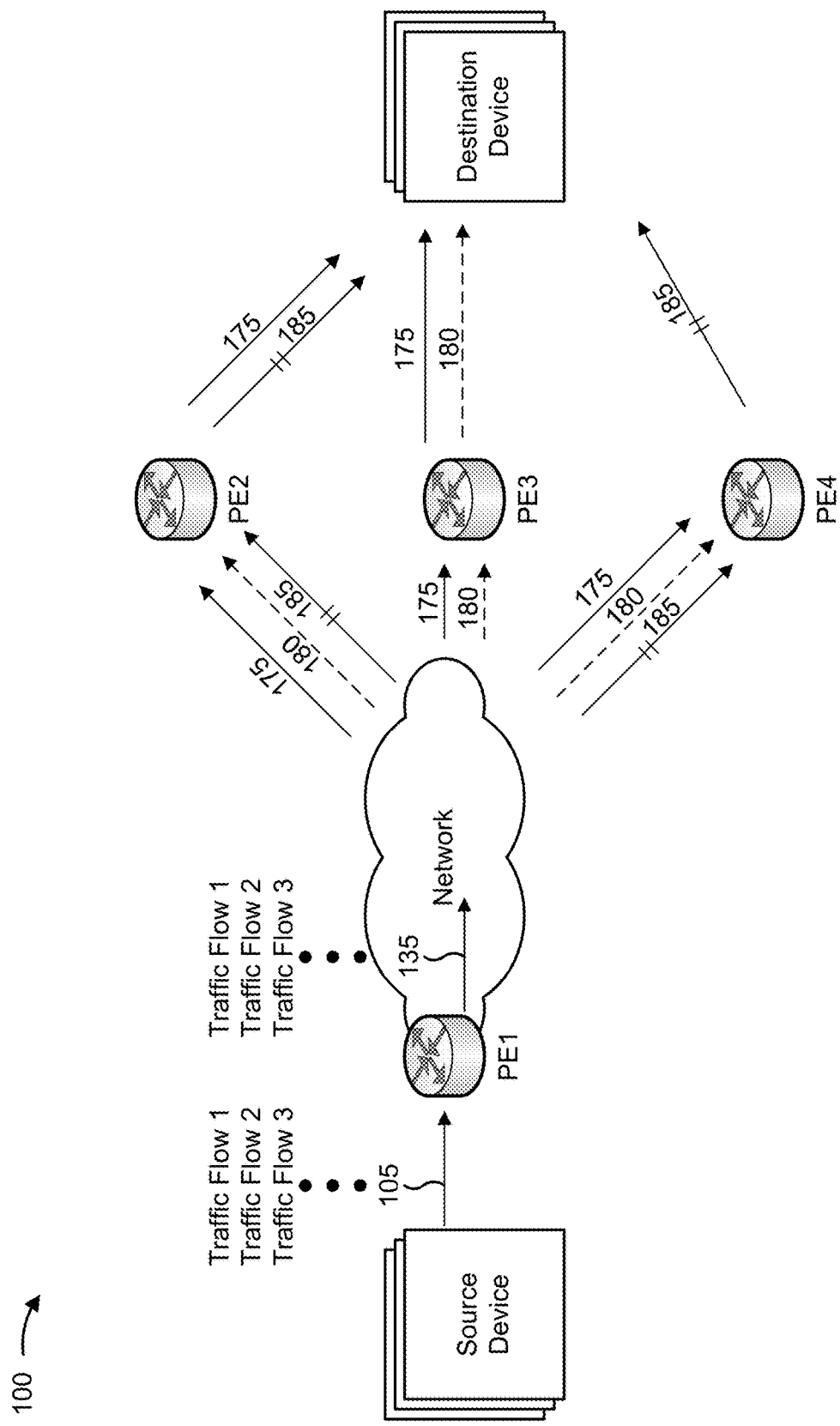

Turning to FIG. 1E, and as shown by reference numbers 175, PE1 may flood forward TF1 using the IMET traffic forwarding technique. For example, PE1 may provide TF1 to PE2, PE3, and PE4. In some implementations, because TF1 is flood forwarded, PEs that are not interested in TF1 (e.g., that would not be associated with a next hop for TF1), such as PE4, may drop TF1. In some implementations, other PEs that received TF1, and that are interested in TF1 (e.g., PE2 and PE3), may provide TF1 to one or more of the set of destination devices using next hops that indicate that TF1 is to be provided to PE2 and PE3, which may then provide TF1 to one or more of the set of destination devices. As shown by reference numbers 180, PE1 may flood forward TF2 using the IMET traffic forwarding technique, in a manner similar to that described with regard to reference number 175. As shown by reference numbers 185, PE1 may selectively forward TF3 using the SMET traffic forwarding technique. For example, PE1 may provide TF3 to PE2 and PE4 using next hops that indicate that TF3 is to be provided to PE2 and PE4, which may then provide TF3 to one or more of the set of destination devices.

In some implementations, PE1 may assign and re-assign traffic forwarding techniques as new traffic flows are received, as conditions are satisfied, and/or the like. For example, PE1 may assign a traffic forwarding technique to a newly received traffic flow in a manner similar to that described elsewhere herein. Additionally, or alternatively, and as another example, PE1 may re-assign traffic forwarding techniques when a particular traffic forwarding technique has been assigned to a threshold quantity of traffic flows in a manner similar to that described elsewhere herein. In some implementations, PE1 may stop assigning a particular traffic forwarding technique to newly received traffic flows when the traffic forwarding technique has been assigned to a threshold quantity of traffic flows (e.g., when PE1 can no longer store additional next hops), and may use a default traffic forwarding technique for newly received traffic flows.

In some implementations, PE1 may perform various actions in association with assigning a traffic forwarding technique, providing a traffic flow, re-assigning a traffic forwarding technique, and/or the like. For example, PE1 may provide information (e.g., for display) to another device that identifies which traffic forwarding techniques are assigned or re-assigned to traffic flows. Additionally, or alternatively, and as another example, PE1 may generate an alert that indicates that a traffic forwarding technique has been assigned to a threshold quantity of traffic flows. Additionally, or alternatively, and as another example, PE1 may generate a policy, a rule, and/or the like for a newly received traffic flow. For example, PE1 may use a machine learning model to determine that the newly received traffic flow is similar to another traffic flow that PE1 has already received and may generate a policy for the newly received traffic flow that is related to assigning a traffic forwarding technique to the traffic flow based on the similarity between the newly received traffic flow and the previously received traffic flow.

In this way, a network device (e.g., PE1) may dynamically utilize a flood forwarding traffic forwarding technique and a selective forwarding traffic forwarding technique to optimize use of memory resources (e.g., for storage of next hops) and use of network resources. For example, the network device may use the flood forwarding traffic forwarding technique for a low resource consumption traffic flow (e.g., a traffic flow with a flow rate that does not satisfy a threshold), and may use a selective forwarding traffic forwarding technique for a high resource consumption traffic flow (e.g., a traffic flow with a flow rate that satisfies a threshold). This conserves memory resources that would otherwise be consumed storing next hops for traffic flows that can be flood forwarded without significant consumption of network resources. In addition, dynamic use of a flood forwarding traffic forwarding technique and a selective forwarding traffic forwarding technique conserves network resources that would otherwise be consumed using flood forwarding for a traffic flow that may consume significant network resources (e.g., due to a packet size of packets associated with the traffic flow, a flow rate of the traffic flow, and/or the like).

As indicated above, FIGS. 1A-1E are provided merely as an example. Other examples may differ from what is described with regard to FIGS. 1A-1E.

Figure 2:
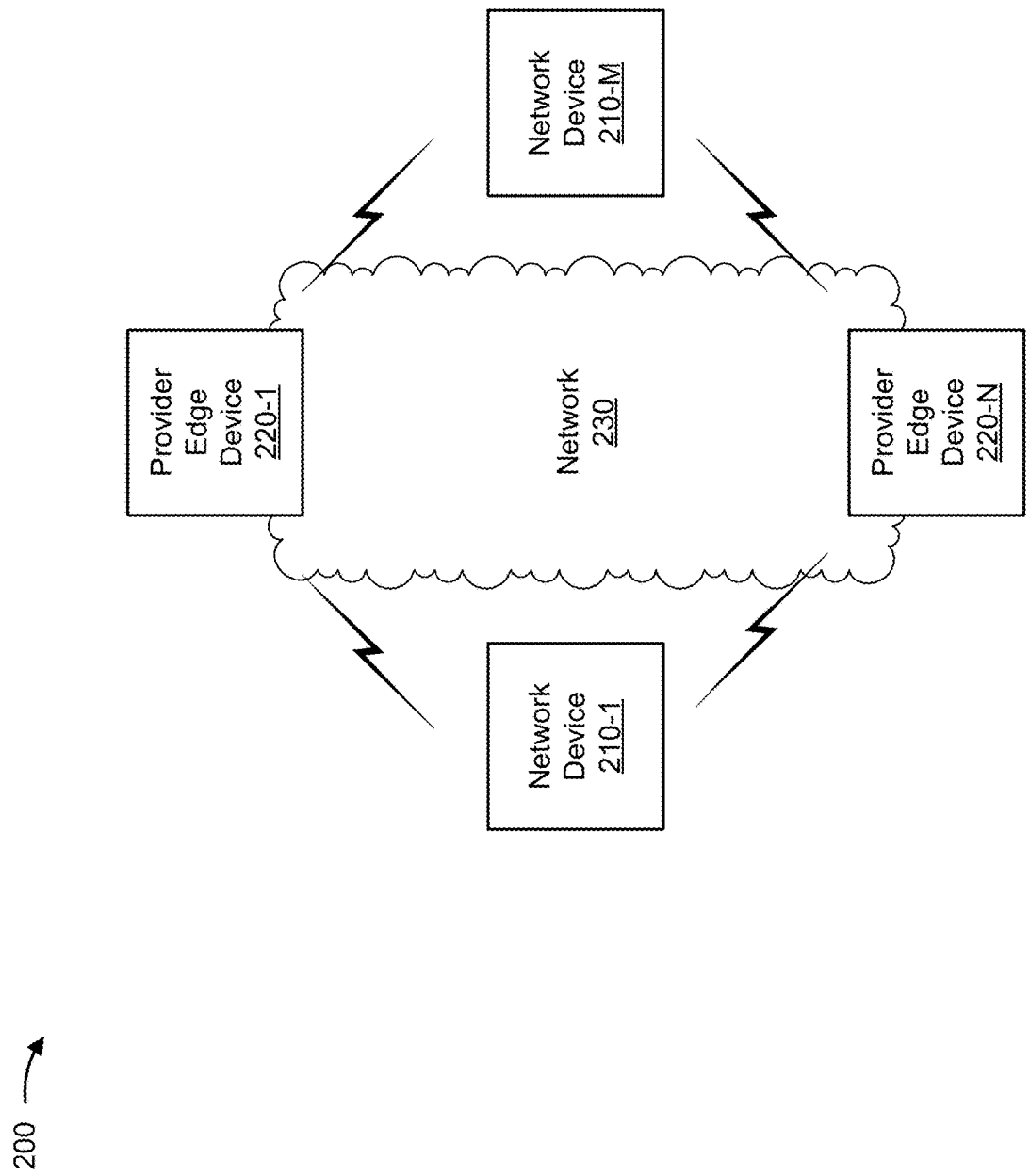
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-M (M≥1) (hereinafter referred to collectively as "network devices 210," and individually as "network device 210"), one or more provider edge devices 220-1 through 220-N (N≥1) (hereinafter referred to collectively as "provider edge devices 220," and individually as "provider edge device 220"), and a network 230. Devices of environment 200 may interconnect via wired connections, wireless connections, or a combination of wired and wireless connections.

Network device 210 includes one or more devices (e.g., one or more traffic transfer devices) capable of processing and/or transferring traffic. For example, network device 210 may include a firewall, a router, a gateway, a switch, a hub, a bridge, a reverse proxy, a server (e.g., a proxy server), a security device, an intrusion detection device, a load balancer, or a similar type of device. In some implementations, network device 210 may transmit traffic to provider edge device 220, as described elsewhere herein. Additionally, or alternatively, network device 210 may receive traffic from provider edge device 220, as described elsewhere herein. In some implementations, network device 210 may include another type of device, such as a client device (e.g., a mobile phone, a desktop computer, and/or the like), a server device (e.g., in a data center), and/or the like. In some implementations, network device 210 may be a source device or a destination device as described elsewhere herein. In some implementations, network device 210 may be a physical device implemented within a housing, such as a chassis. In some implementations, network device 210 may be a virtual device implemented by one or more computer devices of a cloud computing environment or a data center.

Provider edge device 220 includes one or more devices (e.g., one or more traffic transfer devices) capable of processing and/or transferring traffic between endpoint devices. For example, provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, provider edge device 220 may receive traffic from network device 210 and may provide the traffic to another network device 210, as described elsewhere herein. Additionally, or alternatively, provider edge device 220 may receive traffic from network device 210 and may provide the traffic to another provider edge device 220, as described elsewhere herein. In some implementations, provider edge device 220 may be associated with network 230, may dynamically use various traffic forwarding techniques, and/or the like, as described elsewhere herein. In some implementations, provider edge device 220 may be a physical device implemented within a housing, such as a chassis. In some implementations, provider edge device 220 may be a virtual device implemented by one or more computer devices of a cloud computing environment or a data center.

Network 230 includes one or more wired and/or wireless networks. For example, network 230 may include a multi-protocol label switching (MPLS) network, a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an Ethernet virtual private network (EVPN) network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
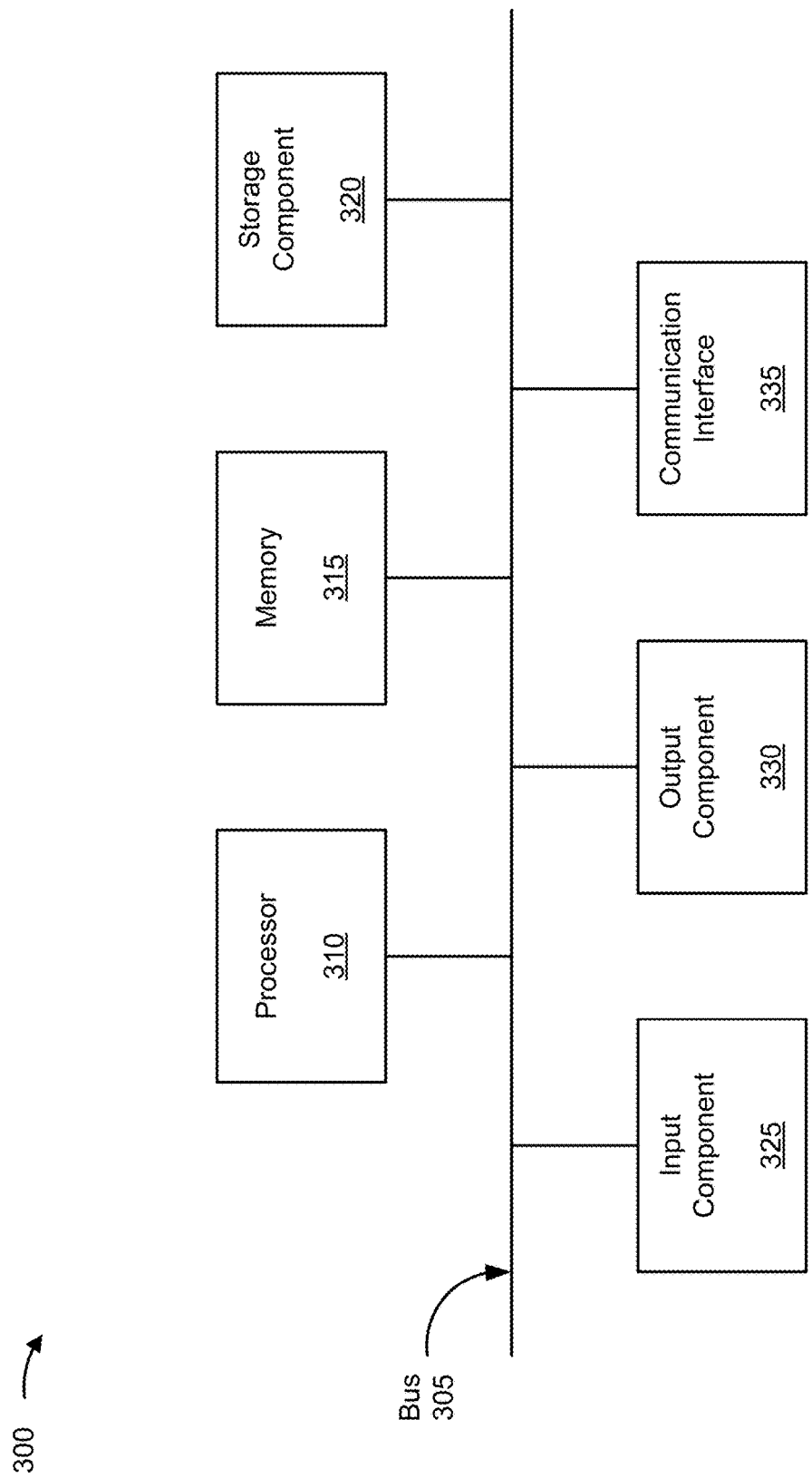
FIGS. 3A and 3B are diagrams of example components of one or more devices of FIG. 2.

FIG. 3A is a diagram of example components of a device 300. Device 300 may correspond to network device 210 and/or provider edge device 220. In some implementations, network device 210 and/or provider edge device 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among components of device 300. Processor 310 is implemented in hardware, firmware, and/or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
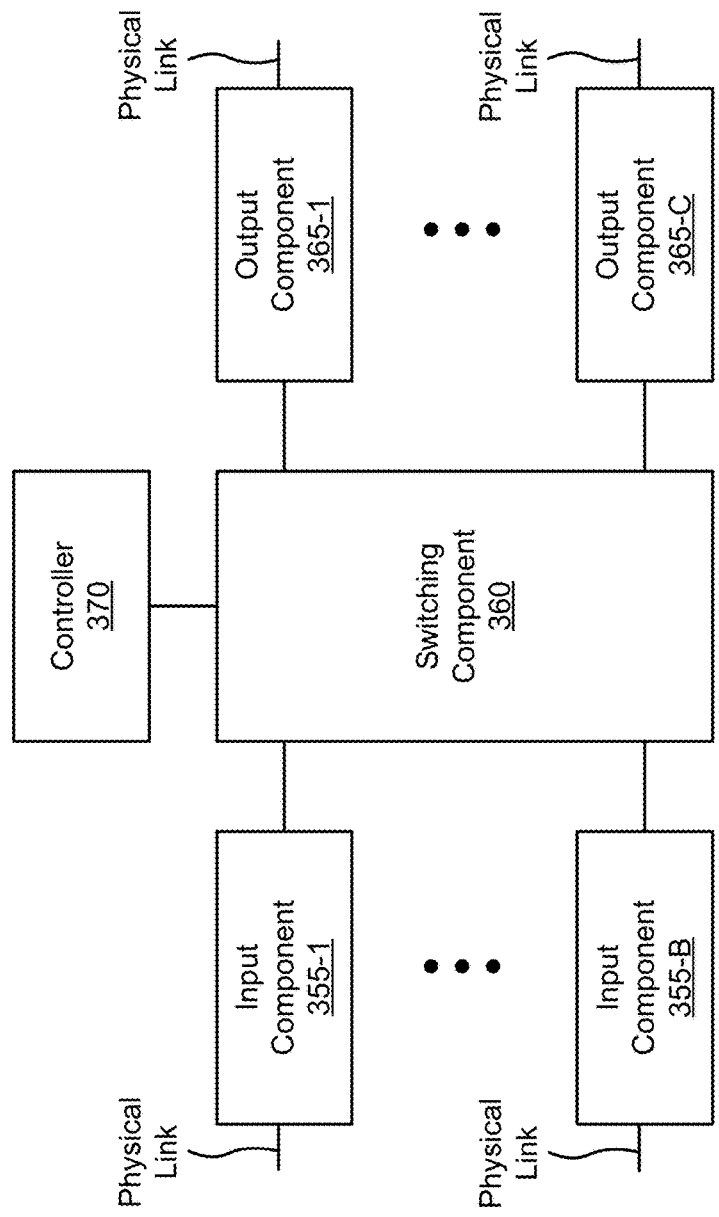

FIG. 3B is a diagram of example components of a device 350. Device 350 may correspond to network device 210 and/or provider edge device 220. In some implementations, network device 210 and/or provider edge device 220 may include one or more devices 350 and/or one or more components of device 350. As shown in FIG. 3, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, and/or a combination of hardware and software. In some implementations, controller 370 may include one or more processors that can be programmed to perform a function.

In some implementations, controller 370 may include a random access memory (RAM), a read only memory (ROM), and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 350 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
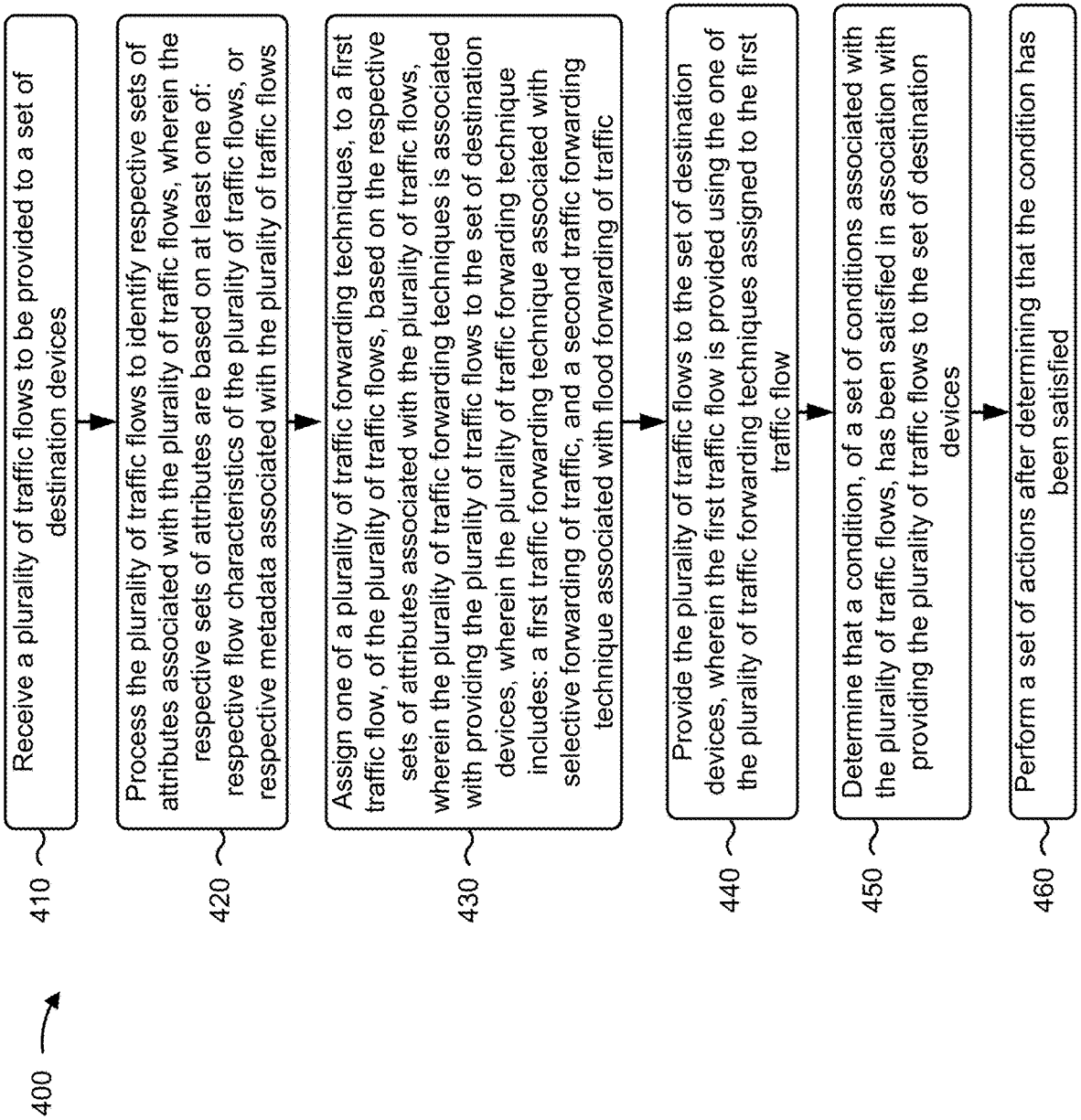
FIGS. 4-6 are flow charts of example processes for dynamically providing traffic via various packet forwarding techniques.

FIG. 4 is a flow chart of an example process 400 for dynamically providing traffic via various packet forwarding techniques. In some implementations, one or more process blocks of FIG. 4 may be performed by a provider edge device (e.g., provider edge device 220). In some implementations, one or more process blocks of FIG. 4 may be performed by another device or a group of devices separate from or including the provider edge device, such as a network device (e.g., network device 210).

As shown in FIG. 4, process 400 may include receiving a plurality of traffic flows to be provided to a set of destination devices (block 410). For example, the provider edge device (e.g., using processor 310, input component 325, communication interface 335, input component 355, switching component 360, controller 370, and/or the like) may receive a plurality of traffic flows to be provided to a set of destination devices, as described above.

As further shown in FIG. 4, process 400 may include processing the plurality of traffic flows to identify respective sets of attributes associated with the plurality of traffic flows, wherein the respective sets of attributes are based on at least one of: respective flow characteristics of the plurality of traffic flows, or respective metadata associated with the plurality of traffic flows (block 420). For example, the provider edge device (e.g., using processor 310, controller 370, and/or the like) may process the plurality of traffic flows to identify respective sets of attributes associated with the plurality of traffic flows, as described above. In some implementations, the respective sets of attributes are based on at least one of: respective flow characteristics of the plurality of traffic flows, or respective metadata associated with the plurality of traffic flows.

As further shown in FIG. 4, process 400 may include assigning one of a plurality of traffic forwarding techniques to a first traffic flow, of the plurality of traffic flows, based on the respective sets of attributes associated with the plurality of traffic flows, wherein the plurality of traffic forwarding techniques is associated with providing the plurality of traffic flows to the set of destination devices, wherein the plurality of traffic forwarding technique includes: a first traffic forwarding technique associated with selective forwarding of traffic, and a second traffic forwarding technique associated with flood forwarding of traffic (block 430). For example, the provider edge device (e.g., using processor 310, controller 370, and/or the like) may assign one of a plurality of traffic forwarding techniques to a first traffic flow, of the plurality of traffic flows, based on the respective sets of attributes associated with the plurality of traffic flows, as described above. In some implementations, the plurality of traffic forwarding techniques is associated with providing the plurality of traffic flows to the set of destination devices. In some implementations, the plurality of traffic forwarding technique includes: a first traffic forwarding technique associated with selective forwarding of traffic, and a second traffic forwarding technique associated with flood forwarding of traffic.

As further shown in FIG. 4, process 400 may include providing the plurality of traffic flows to the set of destination devices, wherein the first traffic flow is provided using the one of the plurality of traffic forwarding techniques assigned to the first traffic flow (block 440). For example, the provider edge device (e.g., using processor 310, output component 330, switching component 360, controller 370, output component 365, and/or the like) may provide the plurality of traffic flows to the set of destination devices, as described above. In some implementations, the first traffic flow is provided using the one of the plurality of traffic forwarding techniques assigned to the first traffic flow.

As further shown in FIG. 4, process 400 may include determining that a condition, of a set of conditions associated with the plurality of traffic flows, has been satisfied in association with providing the plurality of traffic flows to the set of destination devices (block 450). For example, the provider edge device (e.g., using processor 310, controller 370, and/or the like) may determine that a condition, of a set of conditions associated with the plurality of traffic flows, has been satisfied in association with providing the plurality of traffic flows to the set of destination devices, as described above.

As further shown in FIG. 4, process 400 may include performing a set of actions after determining that the condition has been satisfied (block 460). For example, the provider edge device (e.g., using processor 310, memory 315, storage component 320, output component 330, communication interface 335, input component 355, switching component 360, output component 365, controller 370, and/or the like) may perform a set of actions after determining that the condition has been satisfied, as described above.

Process 400 may include additional implementations, such as any single implementation or any combination of implementations described below and/or in connection with one or more other processes described elsewhere herein.

In some implementations, the provider edge device may assign the one of the plurality of traffic forwarding techniques to the first traffic flow based on a respective identifier for the first traffic flow, wherein the respective identifier is included in the respective metadata. In some implementations, the provider edge device may assign the one of the plurality of traffic forwarding techniques to the first traffic flow based on respective resource consumptions associated with the plurality of traffic flows, wherein the respective flow characteristics include the respective resource consumptions.

In some implementations, the provider edge device may identify, after determining that the condition has been satisfied, a subset of traffic flows, of the plurality of traffic flows, for which the one of the plurality of traffic forwarding techniques is to be re-assigned based on at least one of: a change in the respective flow characteristics of the subset of traffic flows, or a change in the respective metadata of the subset of traffic flows; and may re-assign the one of the plurality of traffic forwarding techniques to at least one second traffic flow, of the subset of traffic flows, after identifying the subset of traffic flows. In some implementations, the provider edge device may determine, in association with providing the plurality of traffic flows to the set of destination devices, that the first traffic forwarding technique has been assigned to a threshold quantity of traffic flows of the plurality of traffic flows; and may determine that the condition has been satisfied based on determining that the first traffic forwarding technique has been assigned to the threshold quantity of traffic flows.

In some implementations, the provider edge device may determine that a threshold amount of time has elapsed since providing the plurality of traffic flows to the set of destination devices; and may determine that the condition has been satisfied based on determining that the threshold amount of time has elapsed since providing the plurality of traffic flows to the set of destination devices. In some implementations, the first traffic forwarding technique is a selective multicast Ethernet tag (SMET) traffic forwarding technique, and the second traffic forwarding technique is an inclusive multicast Ethernet tag (IMET) traffic forwarding technique.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
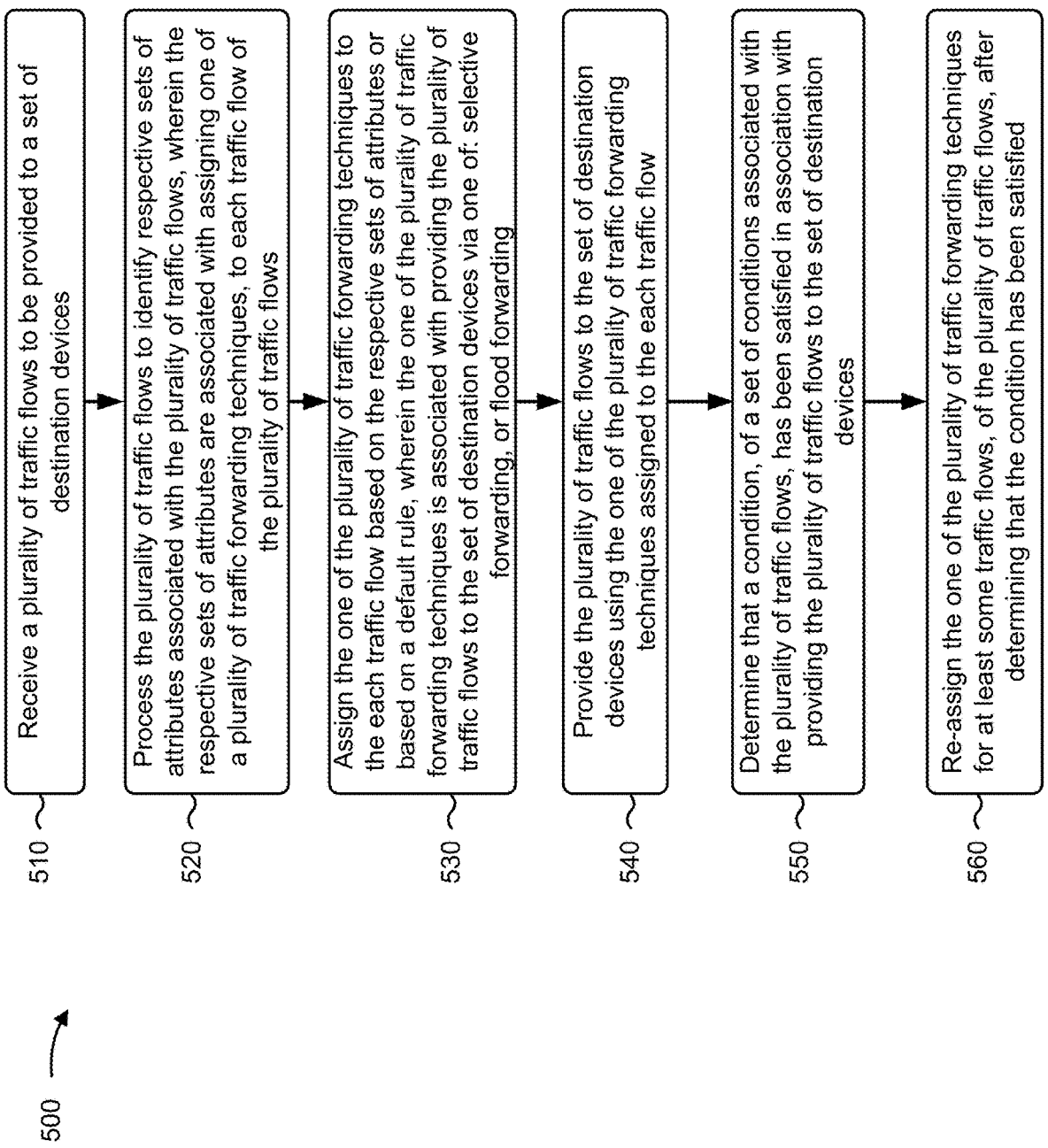

FIG. 5 is a flow chart of an example process 500 for dynamically providing traffic via various packet forwarding techniques. In some implementations, one or more process blocks of FIG. 5 may be performed by a provider edge device (e.g., provider edge device 220). In some implementations, one or more process blocks of FIG. 5 may be performed by another device or a group of devices separate from or including the provider edge device, such as a network device (e.g., network device 210).

As shown in FIG. 5, process 500 may include receiving a plurality of traffic flows to be provided to a set of destination devices (block 510). For example, the provider edge device (e.g., using processor 310, input component 325, communication interface 335, input component 355, switching component 360, controller 370, and/or the like) may receive a plurality of traffic flows to be provided to a set of destination devices, as described above.

As further shown in FIG. 5, process 500 may include processing the plurality of traffic flows to identify respective sets of attributes associated with the plurality of traffic flows, wherein the respective sets of attributes are associated with assigning one of a plurality of traffic forwarding techniques to each traffic flow of the plurality of traffic flows (block 520). For example, the provider edge device (e.g., using processor 310, controller 370, and/or the like) may process the plurality of traffic flows to identify respective sets of attributes associated with the plurality of traffic flows, as described above. In some implementations, the respective sets of attributes are associated with assigning one of a plurality of traffic forwarding techniques to each traffic flow of the plurality of traffic flows.

As further shown in FIG. 5, process 500 may include assigning the one of the plurality of traffic forwarding techniques to the each traffic flow based on the respective sets of attributes or based on a default rule, wherein the one of the plurality of traffic forwarding techniques is associated with providing the plurality of traffic flows to the set of destination devices via one of: selective forwarding, or flood forwarding (block 530). For example, the provider edge device (e.g., using processor 310, controller 370, and/or the like) may assign the one of the plurality of traffic forwarding techniques to the each traffic flow based on the respective sets of attributes or based on a default rule, as described above. In some implementations, the one of the plurality of traffic forwarding techniques is associated with providing the plurality of traffic flows to the set of destination devices via one of: selective forwarding, or flood forwarding.

As further shown in FIG. 5, process 500 may include providing the plurality of traffic flows to the set of destination devices using the one of the plurality of traffic forwarding techniques assigned to the each traffic flow (block 540). For example, the provider edge device (e.g., using processor 310, output component 330, switching component 360, controller 370, output component 365, and/or the like) may provide the plurality of traffic flows to the set of destination devices using the one of the plurality of traffic forwarding techniques assigned to the each traffic flow, as described above.

As further shown in FIG. 5, process 500 may include determining that a condition, of a set of conditions associated with the plurality of traffic flows, has been satisfied in association with providing the plurality of traffic flows to the set of destination devices (block 550). For example, the provider edge device (e.g., using processor 310, controller 370, and/or the like) may determine that a condition, of a set of conditions associated with the plurality of traffic flows, has been satisfied in association with providing the plurality of traffic flows to the set of destination devices, as described above.

As further shown in FIG. 5, process 500 may include re-assigning the one of the plurality of traffic forwarding techniques for at least some traffic flows, of the plurality of traffic flows, after determining that the condition has been satisfied (block 560). For example, the provider edge device (e.g., using processor 310, controller 370, and/or the like) may re-assign the one of the plurality of traffic forwarding techniques for at least some traffic flows, of the plurality of traffic flows, after determining that the condition has been satisfied, as described above.

Process 500 may include additional implementations, such as any single implementation or any combination of implementations described below and/or in connection with one or more other processes described elsewhere herein.

In some implementations, the provider edge device may assign the one of the plurality of traffic forwarding techniques based on at least one of respective flow characteristics of the plurality of traffic flows, or respective metadata associated with the plurality of traffic flows. In some implementations, the provider edge device may re-assign the one of the plurality of traffic forwarding techniques for the at least some traffic flows based on at least one of the respective flow characteristics, or the respective metadata.

In some implementations, the provider edge device may assign a first traffic forwarding technique, of the plurality of traffic flows, to a first subset of traffic flows, of the plurality of traffic flows, based on the default rule; and may assign, in association with assigning the first traffic forwarding technique, a second traffic forwarding technique, of the plurality of traffic flows, to a second subset of traffic flows, of the plurality of traffic flows, based on at least one of: respective flow characteristics of the second subset of traffic flows, or respective metadata associated with the second subset of traffic flows. In some implementations, the provider edge device may re-assign the first traffic forwarding technique to the at least some traffic flows of the second subset of traffic flows; and may re-assign, in association with re-assigning the first traffic forwarding technique, the second traffic forwarding technique to the at least some traffic flows of the first subset of traffic flows.

In some implementations, the provider edge device may process the plurality of traffic flows utilizing a machine learning model after receiving the plurality of traffic flows; and may assign the one of the plurality of traffic forwarding techniques to the each traffic flow based on a result of utilizing the machine learning model to process the plurality of traffic flows. In some implementations, the provider edge device may determine that a threshold quantity of destination devices, of the set of destination devices, is interested in a traffic flow, of the plurality of traffic flows, after receiving the plurality of traffic flows; and may assign the one of the plurality of traffic forwarding techniques to the traffic flow based on determining that the threshold quantity of destination devices is interested in the traffic flow.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
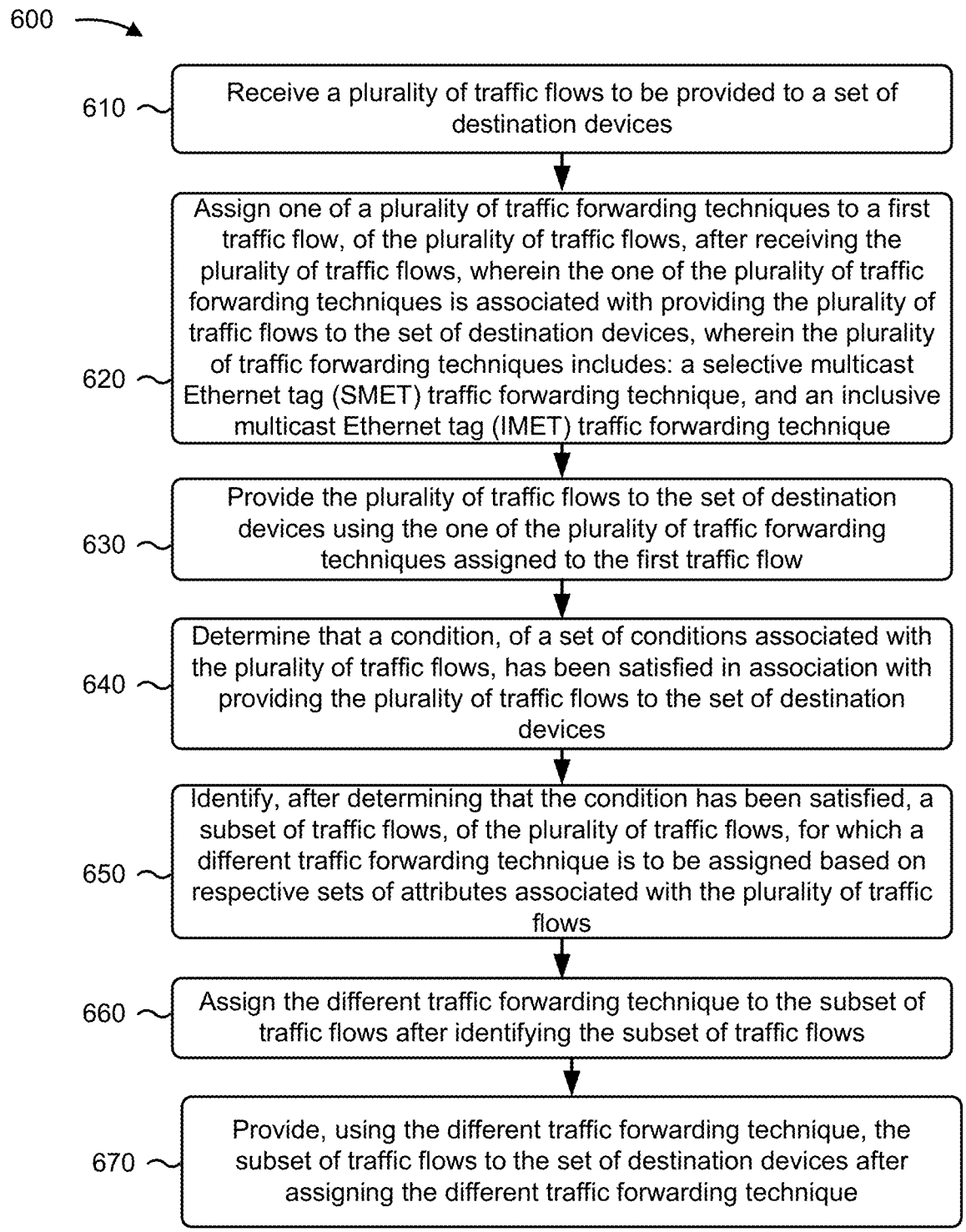

FIG. 6 is a flow chart of an example process 600 for dynamically providing traffic via various packet forwarding techniques. In some implementations, one or more process blocks of FIG. 6 may be performed by a provider edge device (e.g., provider edge device 220). In some implementations, one or more process blocks of FIG. 6 may be performed by another device or a group of devices separate from or including the provider edge device, such as a network device (e.g., network device 210).

As shown in FIG. 6, process 600 may include receiving a plurality of traffic flows to be provided to a set of destination devices (block 610). For example, the provider edge device (e.g., using processor 310, input component 325, communication interface 335, input component 355, switching component 360, controller 370, and/or the like) may receive a plurality of traffic flows to be provided to a set of destination devices, as described above.

As further shown in FIG. 6, process 600 may include assigning one of a plurality of traffic forwarding techniques to a first traffic flow, of the plurality of traffic flows, after receiving the plurality of traffic flows, wherein the one of the plurality of traffic forwarding techniques is associated with providing the plurality of traffic flows to the set of destination devices, wherein the plurality of traffic forwarding techniques includes: a selective multicast Ethernet tag (SMET) traffic forwarding technique, and an inclusive multicast Ethernet tag (IMET) traffic forwarding technique (block 620). For example, the provider edge device (e.g., using processor 310, controller 370, and/or the like) may assign one of a plurality of traffic forwarding techniques to a first traffic flow, of the plurality of traffic flows, after receiving the plurality of traffic flows, as described above. In some implementations, the one of the plurality of traffic forwarding techniques is associated with providing the plurality of traffic flows to the set of destination devices. In some implementations, the plurality of traffic forwarding techniques includes: a selective multicast Ethernet tag (SMET) traffic forwarding technique, and an inclusive multicast Ethernet tag (IMET) traffic forwarding technique.

As further shown in FIG. 6, process 600 may include providing the plurality of traffic flows to the set of destination devices using the one of the plurality of traffic forwarding techniques assigned to the first traffic flow (block 630). For example, the provider edge device (e.g., using processor 310, output component 330, switching component 360, controller 370, output component 365, and/or the like) may provide the plurality of traffic flows to the set of destination devices using the one of the plurality of traffic forwarding techniques assigned to the first traffic flow, as described above.

As further shown in FIG. 6, process 600 may include determining that a condition, of a set of conditions associated with the plurality of traffic flows, has been satisfied in association with providing the plurality of traffic flows to the set of destination devices (block 640). For example, the provider edge device (e.g., processor 310, controller 370, and/or the like) may determine that a condition, of a set of conditions associated with the plurality of traffic flows, has been satisfied in association with providing the plurality of traffic flows to the set of destination devices, as described above.

As further shown in FIG. 6, process 600 may include identifying, after determining that the condition has been satisfied, a subset of traffic flows, of the plurality of traffic flows, for which a different traffic forwarding technique is to be assigned based on respective sets of attributes associated with the plurality of traffic flows (block 650). For example, the provider edge device (e.g., using processor 310, controller 370, and/or the like) may identify, after determining that the condition has been satisfied, a subset of traffic flows, of the plurality of traffic flows, for which a different traffic forwarding technique is to be assigned based on respective sets of attributes associated with the plurality of traffic flows, as described above.

As further shown in FIG. 6, process 600 may include assigning the different traffic forwarding technique to the subset of traffic flows after identifying the subset of traffic flows (block 660). For example, the provider edge device (e.g., using processor 310, controller 370, and/or the like) may assign the different traffic forwarding technique to the subset of traffic flows after identifying the subset of traffic flows, as described above.

As further shown in FIG. 6, process 600 may include providing, using the different traffic forwarding technique, the subset of traffic flows to the set of destination devices after assigning the different traffic forwarding technique (block 670). For example, the provider edge device (e.g., using processor 310, output component 330, switching component 360, controller 370, output component 365, and/or the like) may provide, using the different traffic forwarding technique, the subset of traffic flows to the set of destination devices after assigning the different traffic forwarding technique, as described above.

Process 600 may include additional implementations, such as any single implementation or any combination of implementations described below and/or in connection with one or more other processes described elsewhere herein.

In some implementations, the provider edge device may assign the SMET traffic forwarding technique to a first subset of traffic flows, of the plurality of traffic flows, based on a default rule; and may assign, in association with assigning the SMET traffic forwarding technique, the IMET traffic forwarding technique to a second subset of traffic flows, of the plurality of traffic flows, based on the respective sets of attributes of the second subset of traffic flows. In some implementations, the provider edge device may determine that the SMET traffic forwarding technique has been assigned to a threshold quantity of traffic flows, of the plurality of traffic flows after assigning the SMET traffic forwarding technique to the first subset of traffic flows; and may determine that the condition has been satisfied after determining that the SMET traffic forwarding technique has been assigned to the threshold quantity of traffic flows.

In some implementations, the provider edge device may re-assign, after identifying the subset of traffic flows, the one of the plurality of traffic forwarding techniques to the subset of traffic flows, of the plurality of traffic flows, based on a change to the respective sets of attributes associated with the subset of traffic flows. In some implementations, the provider edge device may classify, prior to identifying the subset of traffic flows, the first traffic flow into a classification, of a plurality of classifications, after identifying the subset of traffic flows, wherein the plurality of classifications includes at least one of: a first resource consumption classification, or a second resource consumption classification. In some implementations, the provider edge device may re-assign the one of the plurality of traffic forwarding techniques to the subset of traffic flows based on the classification associated with the first traffic flow.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the terms "traffic" or "content" may refer to a set of packets. A "packet" may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a plurality of traffic flows to be provided to a set of destination devices;
    processing, by the device, the plurality of traffic flows to identify respective sets of attributes associated with the plurality of traffic flows,
        wherein the respective sets of attributes are based on at least one of:
            respective flow characteristics of the plurality of traffic flows, or
            respective metadata associated with the plurality of traffic flows;
    assigning, by the device, one of a plurality of traffic forwarding techniques, to the plurality of traffic flows, based on the respective sets of attributes associated with the plurality of traffic flows,
        wherein the plurality of traffic forwarding techniques is associated with providing the plurality of traffic flows to the set of destination devices,
        wherein the plurality of traffic forwarding techniques includes:
            a first traffic forwarding technique being a selective forwarding of traffic, and
            a second traffic forwarding technique being a flood forwarding of traffic, and
        wherein assigning the plurality of traffic forwarding techniques includes:
            assigning the selective forwarding traffic technique to a first subset of traffic flows, of the plurality of traffic flows, based on a default rule, and
            assigning, in association with assigning the selective forwarding traffic technique, the flood forwarding technique to a second subset of traffic flows, of the plurality of traffic flows, based on the respective set of attributes of the second subset of traffic flows;
    providing, by the device, the plurality of traffic flows to the set of destination devices,
        wherein the plurality of traffic flows are provided using the one of the plurality of traffic forwarding techniques assigned to the plurality of traffic flows;
    determining, by the device, that a first condition, of a set of conditions associated with the plurality of traffic flows, has been satisfied in association with providing the plurality of traffic flows to the set of destination devices,
        wherein determining that the first condition has been satisfied is in response to determining that the first traffic forwarding technique has been assigned to a threshold quantity of traffic flows;

identifying, by the device and after determining that the first condition has been satisfied, a subset of traffic flows, of the plurality of traffic flows, for which a different traffic forwarding technique is to be assigned based on respective sets of attributes associated with the plurality of traffic flows;

assigning, by the device, the different traffic forwarding technique to the subset of traffic flows after identifying the subset of traffic flows;

providing, by the device and using the different traffic forwarding technique, the subset of traffic flows to the set of destination devices after assigning the different traffic forwarding technique; and performing, by the device, a set of actions after determining that the first condition has been satisfied.

2. The method of claim 1, wherein assigning the one of the plurality of traffic forwarding techniques to the plurality of traffic flows comprises:

assigning the one of the plurality of traffic forwarding techniques to the plurality of traffic flows based on a respective identifiers for the plurality of traffic flows,
wherein the respective identifiers are included in the respective metadata.

3. The method of claim 1, wherein assigning the one of the plurality of traffic forwarding techniques to the plurality of traffic flows comprises:

assigning the one of the plurality of traffic forwarding techniques to the plurality of traffic flows based on respective resource consumptions associated with the plurality of traffic flows,
wherein the respective flow characteristics includes the respective resource consumptions.

4. The method of claim 1, wherein performing the set of actions comprises:

identifying, after determining that the first condition has been satisfied, a subset of traffic flows, of the plurality of traffic flows, for which the one of the plurality of traffic forwarding technique is to be re-assigned based on at least one of:
a change in the respective flow characteristics of the subset of traffic flows, or
a change in the respective metadata of the subset of traffic flows; and
re-assigning the one of the plurality of traffic forwarding techniques to at least one second traffic flow, of the subset of traffic flows, after identifying the subset of traffic flows.

5. The method of claim 1, further comprising:
determining, in association with providing the plurality of traffic flows to the set of destination devices, that the first traffic forwarding technique has been assigned to the threshold quantity of traffic flows of the plurality of traffic flows.

6. The method of claim 1, further comprising:
determining that a threshold amount of time has elapsed since providing the plurality of traffic flows to the set of destination devices; and
determining that a second condition, of the set of conditions, has been satisfied based on determining that the threshold amount of time has elapsed since providing the plurality of traffic flows to the set of destination devices.

7. The method of claim 1, wherein the first traffic forwarding technique is a selective multicast Ethernet tag (SMET) traffic forwarding technique, and wherein the second traffic forwarding technique is an inclusive multicast Ethernet tag (IMET) traffic forwarding technique.

8. A device, comprising:
one or more memories; and
one or more processors to:
receive a plurality of traffic flows to be provided to a set of destination devices;
process the plurality of traffic flows to identify respective sets of attributes associated with the plurality of traffic flows,
wherein the respective sets of attributes are associated with assigning one of a plurality of traffic forwarding techniques, to each traffic flow of the plurality of traffic flows;
assign the one of the plurality of traffic forwarding techniques to the each traffic flow based on the respective sets of attributes or based on a default rule,
wherein the one of the plurality of traffic forwarding techniques is associated with providing the plurality of traffic flows to the set of destination devices,
wherein the plurality of traffic forwarding techniques includes:
a selective forwarding technique, and
a flood forwarding technique, and
wherein the one or more processors, when assigning the one of the plurality of traffic forwarding techniques, are further to:
assign the selective forwarding traffic technique to a first subset of traffic flows, of the plurality of traffic flows, based on the default rule, and
assign, in association with assigning the selective forwarding traffic technique, the flood forwarding technique to a second subset of traffic flows, of the plurality of traffic flows, based on the respective set of attributes of the second subset of traffic flows;
provide the plurality of traffic flows to the set of destination devices using the one of the plurality of traffic forwarding techniques assigned to the each traffic flow;
determine that a first condition, of a set of conditions associated with the plurality of traffic flows, has been satisfied in association with providing the plurality of traffic flows to the set of destination devices and in response to determining that the one of the plurality of traffic forwarding techniques has been assigned to a threshold quantity of traffic flows;
identify, after determining that the first condition has been satisfied, at least some of traffic flows, of the plurality of traffic flows, for which a different traffic forwarding technique is to be assigned based on respective sets of attributes associated with the plurality of traffic flows; and
re-assign the one of the plurality of traffic forwarding techniques for the at least some traffic flows, of the plurality of traffic flows, after determining that the first condition has been satisfied.

9. The device of claim 8, wherein the one or more processors, when assigning the one of the plurality of traffic forwarding techniques to the each traffic flow, are to:
assign the one of the plurality of traffic forwarding techniques based additionally on:
respective metadata associated with the plurality of traffic flows.

10. The device of claim 9, wherein the one or more processors, when re-assigning the one of the plurality of traffic forwarding techniques for the at least some traffic flows, are to:
　　re-assign the one of the plurality of traffic forwarding techniques for the at least some traffic flows based additionally on the respective metadata.

11. The device of claim 8, wherein the one or more processors, when assigning the one of the plurality of traffic forwarding techniques to the each traffic flow, are to:
　　assign a first traffic forwarding technique, of the plurality of traffic forewarding techniques, to the first subset of traffic flows, of the plurality of traffic flows, based on the default rule; and
　　assign, in association with assigning the first traffic forwarding technique, a second traffic forwarding technique, of the plurality of traffic forwarding techniques, to the second subset of traffic flows, of the plurality of traffic flows, based additionally on:
　　　　respective metadata associated with the second subset of traffic flows.

12. The device of claim 11, wherein the one or more processors, when re-assigning the one of the plurality of traffic forwarding techniques for the at least some traffic flows, are to:
　　re-assign the first traffic forwarding technique to the at least some traffic flows of the second subset of traffic flows; and
　　re-assign, in association with re-assigning the first traffic forwarding technique, the second traffic forwarding technique to the at least some traffic flows of the first subset of traffic flows.

13. The device of claim 8, wherein the one or more processors, when processing the plurality of traffic flows, are to:
　　process the plurality of traffic flows utilizing a machine learning model after receiving the plurality of traffic flows; and
　　wherein the one or more processors, when assigning the one of the plurality of traffic forwarding techniques to the each traffic flow, are to:
　　　　assign the one of the plurality of traffic forwarding techniques to the each traffic flow based on a result of utilizing the machine learning model to process the plurality of traffic flows.

14. The device of claim 8, wherein the one or more processors are further to:
　　determine that a threshold quantity of destination devices, of the set of destination devices, is interested in a traffic flow, of the plurality of traffic flows, after receiving the plurality of traffic flows; and
　　wherein the one or more processors, when assigning the one of the plurality of traffic forwarding techniques to the each traffic flow, are to:
　　　　assign the one of the plurality of traffic forwarding techniques to the traffic flow based on determining that the threshold quantity of destination devices is interested in the traffic flow.

15. A non-transitory computer-readable medium storing instructions, the instructions comprising:
　　one or more instructions that, when executed by one or more processors, cause the one or more processors to:
　　　　receive a plurality of traffic flows to be provided to a set of destination devices;
　　　　assign one of a plurality of traffic forwarding techniques to the plurality of traffic flows, after receiving the plurality of traffic flows,
　　　　　　wherein the one of the plurality of traffic forwarding techniques is associated with providing the plurality of traffic flows to the set of destination devices,
　　　　　　wherein the plurality of traffic forwarding techniques includes:
　　　　　　　　a selective multicast Ethernet tag (SMET) traffic forwarding technique, and
　　　　　　　　an inclusive multicast Ethernet tag (IMET) traffic forwarding technique, and
　　　　　　wherein the one or more instructions, that cause the one or more processors to assign the one of the plurality of traffic forwarding techniques, cause the one or more processors to:
　　　　　　　　assign the SMET traffic forwarding technique to a first subset of traffic flows, of the plurality of traffic flows, based on a default rule, and
　　　　　　　　assign, in association with assigning the SMET traffic forwarding technique, the IMET technique to a second subset of traffic flows, of the plurality of traffic flows, based on a respective set of attributes of the second subset of traffic flows;
　　　　provide the plurality of traffic flows to the set of destination devices using the one of the plurality of traffic forwarding techniques assigned to the plurality of traffic flows;
　　　　determine that a condition, of a set of conditions associated with the plurality of traffic flows, has been satisfied in association with providing the plurality of traffic flows to the set of destination devices;
　　　　identify, after determining that the condition has been satisfied, a subset of traffic flows, of the plurality of traffic flows, for which a different traffic forwarding technique is to be assigned based on respective sets of attributes associated with the plurality of traffic flows;
　　　　assign the different traffic forwarding technique to the subset of traffic flows after identifying the subset of traffic flows; and
　　　　provide, using the different traffic forwarding technique, the subset of traffic flows to the set of destination devices after assigning the different traffic forwarding technique.

16. The non-transitory computer-readable medium of claim 15, wherein the one or more instructions, when executed by the one or more processors, further cause the one or more processors to:
　　determine that the SMET traffic forwarding technique has been assigned to a threshold quantity of traffic flows, of the plurality of traffic flows after assigning the SMET traffic forwarding technique to the first subset of traffic flows; and
　　wherein the one or more instructions, that cause the one or more processors to determine that the condition has been satisfied, cause the one or more processors to:
　　　　determine that the condition has been satisfied after determining that the SMET traffic forwarding technique has been assigned to the threshold quantity of traffic flows.

17. The non-transitory computer-readable medium of claim 15, wherein the one or more instructions, when executed by the one or more processors, further cause the one or more processors to:
　　re-assign, after identifying the subset of traffic flows, the one of the plurality of traffic forwarding techniques to the subset of traffic flows, of the plurality of traffic flows, based on a change to the respective sets of attributes associated with the subset of traffic flows.

18. The non-transitory computer-readable medium of claim 15, wherein the one or more instructions, when executed by the one or more processors, cause the one or more processors to:
    classify, after identifying the subset of traffic flows, the first subset of traffic flows into a classification, of a plurality of classifications,
        wherein the plurality of classifications includes at least one of:
            a first resource consumption classification, or
            a second resource consumption classification.

19. The non-transitory computer-readable medium of claim 18, wherein the one or instructions, when executed by the one or more processors, further cause the one or more processors to:
    re-assign the one of the plurality of traffic forwarding techniques to the subset of traffic flows based on the classification associated with the first subset of traffic flows.

20. The non-transitory computer-readable medium of claim 15, wherein the one or more instructions, when executed by the one or more processors, further cause the one or more processors to:
    re-assign, after identifying the subset of traffic flows, the one of the plurality of traffic forwarding techniques to the subset of traffic flows, of the plurality of traffic flows, based on a change in respective metadata of the subset of traffic flows.

\* \* \* \* \*

UNITED STATES PATENT AND TRADEMARK OFFICE
CERTIFICATE OF CORRECTION

PATENT NO. : 10,887,122 B1
APPLICATION NO. : 16/195061
DATED : January 5, 2021
INVENTOR(S) : Vikram Nagarajan et al.

It is certified that error appears in the above-identified patent and that said Letters Patent is hereby corrected as shown below:

In the Claims

Column 23, Claim 2, Lines 22-23 currently read "techniques to the plurality of traffic flows based on a respective identifiers for the plurality of traffic flows," should read -- techniques to the plurality of traffic flows based on respective identifiers for the plurality of traffic flows, --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*